United States Patent [19]

Di Piazza

[11] 4,349,716
[45] Sep. 14, 1982

[54] MECHANICAL CONTROL HEAD FOR GUIDING THE MOVEMENT OF A TOOL, PARTICULARLY OF AN ELECTRODE ADAPTED TO MAKE A CAVITY IN A METAL PIECE, BY ELECTROEROSION

[75] Inventor: Learco Di Piazza, Ispra, Italy

[73] Assignee: European Atomic Energy Community (EURATOM), Luxemburg, Luxembourg

[21] Appl. No.: 214,768

[22] Filed: Dec. 9, 1980

[30] Foreign Application Priority Data

Dec. 14, 1979 [LU] Luxembourg .............................. 81995

[51] Int. Cl.³ ............................................... B23P 1/12
[52] U.S. Cl. .................................... 219/69 E; 204/286
[58] Field of Search ................ 219/69 R, 69 E, 69 M; 204/286, 224 R, 224 M, 129.55

[56] References Cited

U.S. PATENT DOCUMENTS 3,719,569  3/1973  Gosger ............................ 204/129.55
4,104,503  8/1978  Di Piazza et al. ................ 219/69 E

FOREIGN PATENT DOCUMENTS 813071  5/1959  United Kingdom .

Primary Examiner—B. A. Reynolds
Assistant Examiner—D. A. Tone
Attorney, Agent, or Firm—Stevens, Davis, Miller & Mosher

[57] ABSTRACT

The present invention relates to a mechanical control head for guiding the movement of a tool and particularly an electrode for electroerosion by means of a control rod with a forked end. The control has the following elements in combination: (a) a connection of the tool on a support terminating in a foot in the form of a spatula with tapered edge; (b) an articulated, centered connection of the foot in the forked end of a control rod, said rod presenting an annular shoulder spaced from the spatula-shaped foot and adapted to rotate about its axis and move in the axial direction; (c) a coaxial assembly of a hollow guide prism whose guide face, in contact with the tapered edge of the spatula-shaped foot, is cut obliquely, while the opposite face of the prism, perpendicular to the axis of the prism, rests on the shoulder of the control rod.

4 Claims, 7 Drawing Figures

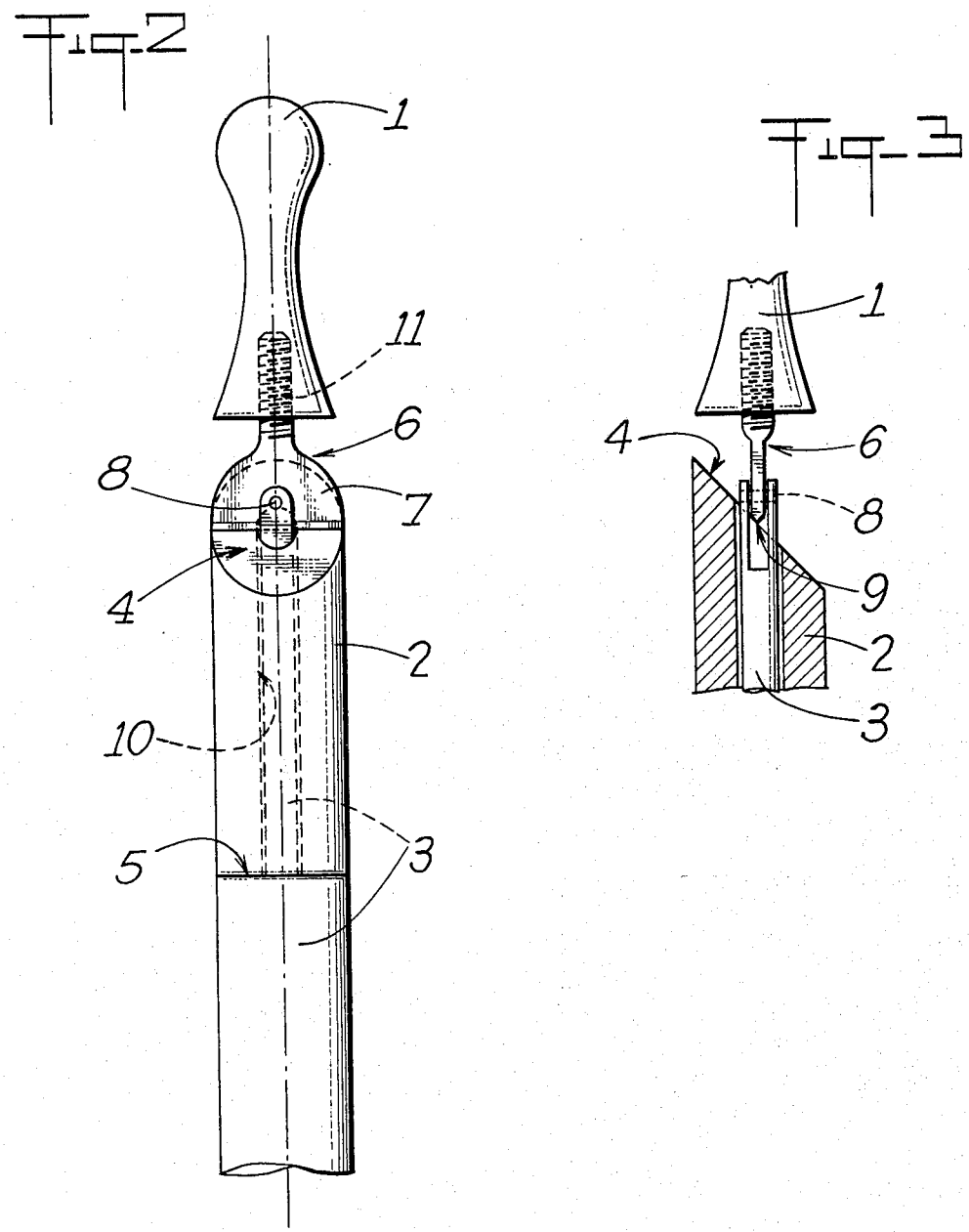

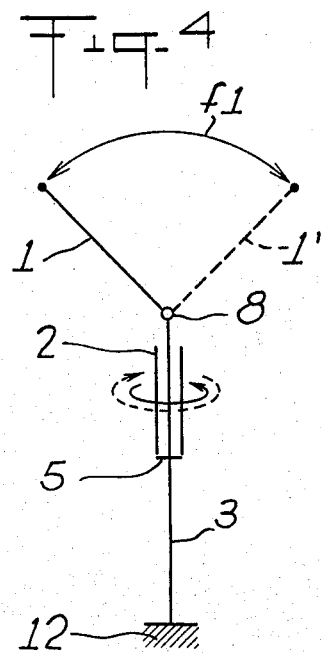
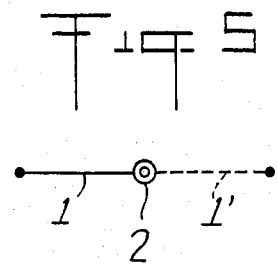
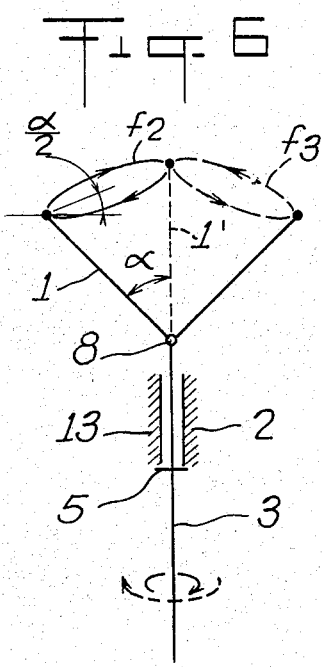
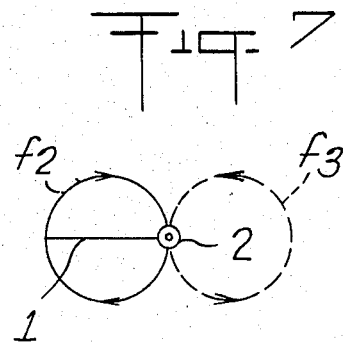

MECHANICAL CONTROL HEAD FOR GUIDING THE MOVEMENT OF A TOOL, PARTICULARLY OF AN ELECTRODE ADAPTED TO MAKE A CAVITY IN A METAL PIECE, BY ELECTROEROSION

The present invention relates to a mechanical control head for guiding the movement of a tool, particularly of an electrode adapted to make a cavity in a metal piece, by electroerosion.

German DOS 2,644,888 describes a process and a device for making cavities of revolution in solid metal pieces by electroerosion; a rod-shaped electrode is used, which, via a control head, may be displaced along the three trilinear co-ordinates. The electrode is guided by means of a control rod with axial thrust, articulated on an electrode-holder.

Research, which has led up to the present invention, has shown that both the precision and speed of the work of the tool could be considerably improved by the following arrangements, taken in combination to improve the construction of the control head:

connection of the tool, particularly of the electrode, on a support terminating in a foot in the form of a spatula with tapered edge;

articulated, centred connection of the foot in the forked end of a control rod, having a shoulder at a distance, freely chosen, from the spatula-shaped foot and adapted to be animated by a movement of rotation about its axis and a movement of axial displacement;

coaxial assembly of a hollow guide prism of which the end face (guide face) in contact with the tapered edge of the spatula-shaped foot is cut obliquely, while the opposite face rests on the shoulder of the control rod.

Due to the construction of the control head according to the invention, a relative movement of rotation of the control rod with respect to the guide prism causes a rotational slide of the tapered edge of the spatula-shaped foot on the guide face.

The resulting movement of the tool depends on that of the two elements—guide prism and extension of the control rod beyond the hollow of said guide prism—which is maintained immobile during the relative movement. When the control rod is maintained immobile and the prism, and therefore the guide face, is rotated, the tool describes an oscillating movement in a plane passing through the axis of the control rod, the degree of oscillation being determined by the inclination of the guide face (modus operandi I). If, on the contrary, the guide prism, and therefore the inclined face at the end of this prism, is immobilized and the control rod is rotated, the end of the tool describes a circular movement about the base of a cone of which the apex is located at the articulation of the spatula-shaped foot and of which the generatrix merges, in its steepest position, with the axis of symmetry of the control rod, and in its position of maximum inclination, with a perpendicular to the guide face (modus operandi II). From the qualitative standpoint, this movement remains identical whatever the orientation of the guide face in space.

The sole purpose of the foregoing explanation of the two extreme movements of the tool, which may be made in principle with the device of the invention, is to illustrate the action of the control head and in no way signifies that these movements are all made whenever a tool, of which the movement is guided by said control head, is used.

By way of example, it may be indicated that, for making cavities of revolution in a metal piece, by electroerosion, modus operandi II is applied, with the particular feature that the relative speed of rotation between the piece and the tool is high with respect to the speed of advance of the electrode.

The invention will be more readily understood on reading the following description with reference to the accompanying drawings, in which:

FIG. 2 shows another side view which corresponds to a rotation though 90° with respect to FIG. 1 and in which the electrode occupies the steepest position of modus operandi II.

FIG. 3 shows in greater detail the articulated connection of the spatula-shaped foot in the forked end of the control rod.

Figure 1:
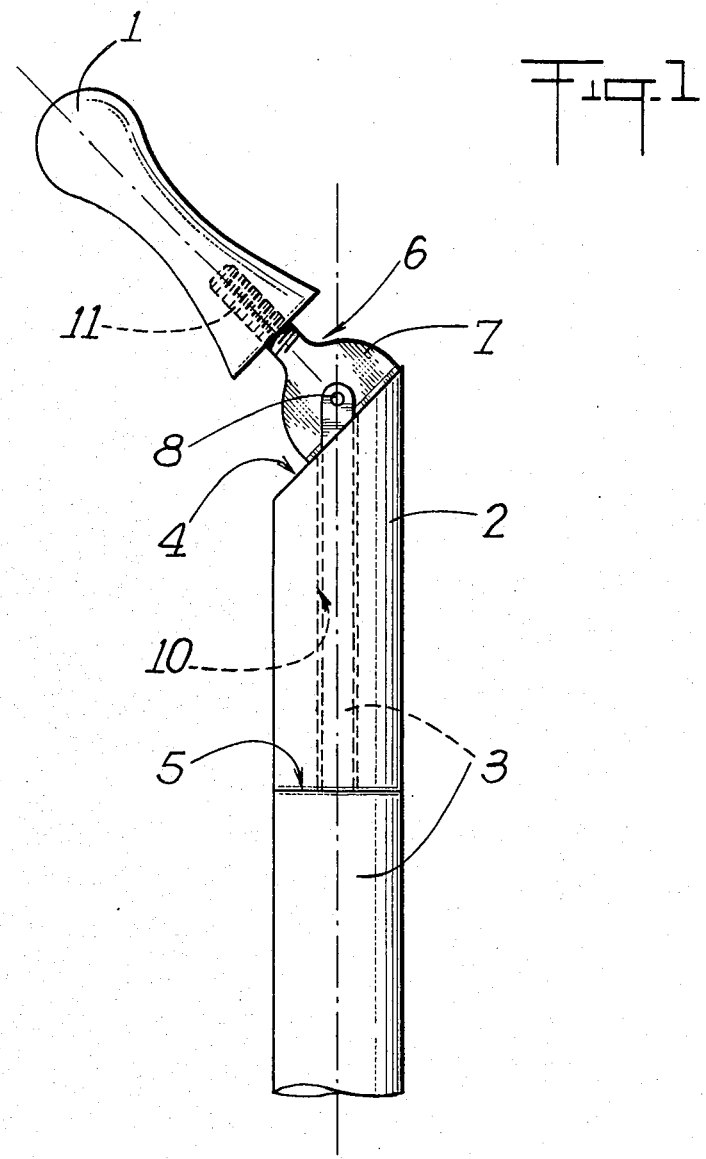
FIG. 1 is a side view of a control head according to the invention and shows the electrode in the maximum inclination of modus operandi II.

FIG. 4 indicates schematically, in side view, the extreme positions taken by the tool in modus operandi I;

FIg. 5 is a plan view of the schematic representation of FIG. 4.

FIG. 6 shows schematically in side view the movement of the tool in modus operandi II, the position of the guide face corresponding to that of FIG. 1.

FIG. 7 schematically shows, in plan view, the movement of FIG. 6.

Referring now to the drawings, FIGS. 1 and 2 show the tool 1 which is a graphite electrode in the form of a pin. The guide prism is reference 2, the guide face bears reference 4. Part of the control rod 3 passes coaxially through the prism 2 in the bore 10. The prism 2 rests on the annular shoulder 5 of the control rod 3.

The support 6 of the tool comprises a threaded rod 11, engaged in the tool, and a foot 7 in the form of a spatula. The spatula shaped foot 7 is fixed in the forked end of the rod 3 by means of a pivot pin 8. As shown in FIG. 3, the spatula comprises a tapered edge 9 via which the foot rests with friction on the guide face 4. In modus operandi I (FIGS. 4 and 5), the control rod 3 is immobilized, which is suggested by the hatched anchoring 12. When a movement of rotation is imparted to the guide prism in one or the other direction, the electrode describes a movement of oscillation $f_1$ between the positions 1 and 1'.

With this modus operandi, two types of cavities may be made in a solid piece by electroerosion. If the piece is fixed, the approach and penetration of the oscillating electrode makes in this piece a groove in the form of an arc of circle or, if penetration continues, a segment of circle. A cavity in the form of a cone with convex base may also be made if the electrode, in position aligned with the control rod, is introduced into a hollow made in the workpiece, said piece being rotated. The guide prism or the control rod is then rotated slowly.

For the end of the electrode to be able to pass over path $f_1$, from position 1 towards position 1', the guide prism is rotated through 180°, as shown directly in FIG. 1. In fact, the electrode then occupies a position symmetrical with respect to that shown, being inclined towards the right. It should be noted that the shape of the electrodes is chosen as a function of the shapes which it is desired to give the grooves or cavities made.

In the case of modus operandi II (FIGS. 6, 7), the guide prism 2 is immobilized, as suggested by hatched anchorings 13. If the guide rod is rotated in one or the other direction, the end of the electrode follows the circular movement $f_2$ in an inclined plane with respect to that of the guide face. In the case of FIG. 1, the inclination of the guide face $\alpha=45°$. The inclination of the circular path $f_2$ with respect to the horizontal is then 22.5°. Of the different inclined positions that the electrode occupies on pasing over path $f_2$, only positions 1 and 1' are shown.

Modus operandi II also enables two types of cavities to be made in a solid metal piece by electroerosion. However, these two types differ from each other only by the positions of the cavities. If the piece is immobilized, a hollow in the form of a cone, inclined with respect to the axis of the control rod, may be obtained. If, on the contrary, the workpiece is rotated, a conical cavity with convex base may be made by firstly introducing the electrode, aligned with the control rod, in a hollow made in said workpiece. To this end, the guide prism or the control rod is rotated slowly about its axis. To make the whole cavity, it suffices that the guide prism or the control rod rotates through 90° as may be seen on comparing FIGS. 1 and 2 which show the positions of the spatula-shaped foot before and after rotation of the guide prism through 90°.

The last described modus operandi is, for example, particularly applicable in the making of cavities in valve heads in internal combustion engines.

The use of the control head according to the invention has made it possible to reduce the time for making a cavity to a fraction, for example one third, of the time required by the method according to prior art DOS 2,644,888. An additional advantage is the precise, well controlled guiding made with the aid of the tapered edge of the spatula-shaped foot.

Another advantage results from the fact that, in machining of type II, the electrode is no longer consumed along one generatrix; in fact, as may be seen in FIS. 6 and 7, the electrode may be used for making blanks (case of path $f_2$, with rotation from 0° to 90° and wear along generatrix marked (1). By continuing rotation from 90° to 180°, this same electrode is returned to its starting position, then by rotation from 180° to 270°, the electrode may be used along $f_3$ for finishing, the electrode then presenting a non-worn generatrix in contact with the piece (generatrix opposite the blank generatrix). This latter advantage guarantees machining precision along the section initially provided.

The means used for controlling and regulating the movement of the different members of the control head according to the invention are conventional and are not part of the invention. Regulation is preferably effected by electronic means, the quantity regulated being for example an electrical quantity analogical of the appropriate distance between the electrode and the piece to be worked by electroerosion. On the other hand, the control rod may advantageously be tubular in order to allow the circulation of the dielectric up to the machined cavity.

To make different shapes of cavities, the shape of the electrodes, the inclination of the guide face and/or other influencing factors such as the configuration of the tapered edge of the spatula-shaped foot, may be adapted. Such modifications may be made by the man skilled in the art and do not depart from the scope of the invention.

What is claimed is:

1. A mechanical control head comprising:
    a guided tool for the removal of material from a workpiece by electroerosion;
    said tool being mounted on a spatula shaped foot having a tapered edge, said foot being pivotally mounted to one end of a control rod having an annular shoulder spaced from said one end;
    a guide prism coaxially disposed about said control rod between said annular shoulder and said one end; the guide prism having a guide face adjacent said tapered edge;
    said guide prism and said central rod being mounted for rotational movement in relation to each other so that either one may be rotated while the other is held stationary to cause said foot to follow a preselected course by constant movement over the guide face, thus correspondly moving the guided tool.

2. The control head of claim 1 in which the guide face of the prism is inclined with respect to the vertical axis of the prism.

3. The control head of claim 1 in which the guide tool is an electrode.

4. The control head of claim 1 in which the spatula shaped foot has a double tapered edge.

* * * * *